(12) United States Patent
Li et al.

(10) Patent No.: US 9,477,821 B2
(45) Date of Patent: Oct. 25, 2016

(54) GENERIC FEATURE-LICENSING FRAMEWORK

(71) Applicant: MOTOROLA MOBILITY LLC, Libertyville, IL (US)

(72) Inventors: Cheng Li, San Diego, CA (US); Ying Chen, San Diego, CA (US); Xiaozhou Fu, San Diego, CA (US); Xin Qiu, San Diego, CA (US); Ting Yao, San Diego, CA (US); Jinsong Zheng, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

(21) Appl. No.: 14/016,613

(22) Filed: Sep. 3, 2013

(65) Prior Publication Data

US 2014/0141762 A1 May 22, 2014

Related U.S. Application Data

(60) Provisional application No. 61/728,235, filed on Nov. 19, 2012.

(51) Int. Cl.
*H04M 3/00* (2006.01)
*G06F 21/10* (2013.01)
*H04L 29/06* (2006.01)
*G06F 21/62* (2013.01)

(52) U.S. Cl.
CPC ............ *G06F 21/105* (2013.01); *G06F 21/10* (2013.01); *G06F 21/629* (2013.01); *H04L 63/0823* (2013.01)

(58) Field of Classification Search
CPC . G06F 21/10; G06F 21/105; H04L 63/0823; H04W 4/001
USPC ........................ 455/418, 419, 420, 90.1, 411
See application file for complete search history.

(56) References Cited

U.S. PATENT DOCUMENTS

| | | | |
|---|---|---|---|
| 7,165,041 B1 | 1/2007 | Guheen et al. | |
| 7,225,165 B1* | 5/2007 | Kyojima | G06Q 50/18 705/52 |
| 7,346,585 B1 | 3/2008 | Alabraba et al. | |
| 2004/0039916 A1 | 2/2004 | Aldis et al. | |
| 2004/0102183 A1 | 5/2004 | Haub et al. | |
| 2006/0020553 A1* | 1/2006 | Septon | G06F 21/105 705/59 |
| 2006/0106728 A1 | 5/2006 | Yellai et al. | |
| 2006/0179002 A1 | 8/2006 | Brooks et al. | |
| 2007/0244824 A1* | 10/2007 | Motley et al. | 705/59 |
| 2008/0071689 A1* | 3/2008 | Tabet | G06F 8/60 705/59 |
| 2008/0234046 A1* | 9/2008 | Kinsley | G06F 21/10 463/40 |
| 2010/0106659 A1 | 4/2010 | Stefik et al. | |
| 2010/0131518 A1* | 5/2010 | Elteto | G06F 21/105 707/752 |
| 2010/0191800 A1* | 7/2010 | Jaber et al. | 709/203 |
| 2011/0196793 A1* | 8/2011 | Zheng | G06Q 30/00 705/50 |
| 2012/0079393 A1* | 3/2012 | Raithinam | G06F 21/105 715/744 |
| 2012/0174201 A1* | 7/2012 | Jaber et al. | 726/6 |
| 2014/0032350 A1* | 1/2014 | Biswas et al. | 705/26.3 |

OTHER PUBLICATIONS

International Search Report and Written Opinion issued in PCT/US2011/023860 dated Jan. 3, 2013.

* cited by examiner

*Primary Examiner* — Khalid Shaheed
(74) *Attorney, Agent, or Firm* — Morris & Kamlay LLP (57) ABSTRACT

Disclosed is an arrangement to enable customers to provision devices with feature licenses that enable specified features in the devices. The arrangement includes a feature-licensing system for performing feature-licensing processes to provision the devices with feature licenses and a feature-licensing process configuration system.

17 Claims, 5 Drawing Sheets

ID
GENERIC FEATURE-LICENSING FRAMEWORK

CROSS-REFERENCE TO RELATED APPLICATIONS

The present application claims priority to U.S. Provisional Patent Application 61/728,235, filed on Nov. 19, 2012, which is incorporated herein by reference in its entirety.

TECHNICAL FIELD

The present disclosure is related generally to computing systems and, more particularly, to feature-licensing systems.

BACKGROUND

As technologies advance rapidly, manufacturers are adding an increasingly large number of features to their products. Since customer needs vary over a wide range and constantly evolve, it is necessary for manufacturers to implement systems that can handle the customization of features for the initial configuration of and the subsequent changes in the product-feature set. For example, a manufacturer of mobile phones such as Motorola may offer mobile phones that are capable of supporting a number of features in addition to voice such as data, texting, GPS services, WiFi connectivity, web browsing, text-to speech, and so on. The direct customers of the manufacturer, who in the case of mobile phones are often service providers such as Verizon and ATT, for instance, may wish to obtain mobile phones with different combinations of these features in order to meet the varying needs of the end users.

To address this issue, manufacturers have turned to feature licensing, which provides a feature-control mechanism that allows customers to obtain a license to enable only the product features that meet their specific needs. Feature licensing brings many benefits to both manufacturers and customers. For example, feature licensing allows manufacturers to have a single build of a product that incorporates all available features and to rely on feature licensing to enable different combinations of features. In addition, customers can get the exact features for a product that meets their specific needs without having to pay for undesired features. Feature licensing also allows manufacturers and customers to manage product upgrades and downgrades through license changes, eliminating the need to deploy different product versions and reducing operational downtime.

To achieve such benefits, feature-licensing systems have been developed which allow different manufacturers, and even different organizations within the same manufacturer, to generate license files for different products and different product lines. These systems generate feature-license files which have a generic format. Such a generic feature-licensing system may be operated and supported by a third party. Users of such a system may include users associated with the manufacturers, operators of the system who support and maintain the system, and customers (e.g., service providers, consumer end users) who will be using the various features of a product for which licenses are being obtained.

Even if a new product is introduced which uses the generic feature-licensing format, particular technical and business requirements nevertheless may require variations to certain aspects of the generic feature-licensing process, which can be difficult to implement.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

As used herein, "feature credit" refers to an available quantity of a feature.

"Generic feature-licensing system" (or "licensing system") refers to a system that generates or otherwise performs an action on a feature license. "Feature-licensing process" (or "licensing process") refers to a process that performs an action on a feature license, such as license generation, update and revocation, as well as the credit-management tasks associated with the action. "Feature-licensing activity" (or "activity") refers to the smallest functional unit used to perform an atomic step in a feature-licensing process, with simple input and output parameters. "Feature-licensing activity configuration" (or "activity configuration," or "configuration") refers to a sequence of one or more feature-licensing activities.

"Configuration retrieval point" (or "retrieval point") refers to a point in a feature-licensing process where a feature-licensing activity configuration is needed and is retrieved from the feature-licensing process configuration system.

"Configuration-lookup attributes" (or "lookup attributes") refer to the attributes for looking up a specific feature-licensing activity configuration. "Licensing-scenario attributes" (or "scenario attributes") refer to the attributes that describe the circumstances or scenario in which a licensing-related action is taking place. "Feature-licensing process configuration system" (or "configuration system") refers to a system that defines and stores feature-licensing activity configurations.

As discussed above, even if a license for a new product is generated using the generic feature-licensing format, variations to certain aspects of the licensing process may be needed. Such changes may include, for instance, changes to the license-update policy in which a new product is to use its own set of permissions for adding features to or removing features from an existing license. Likewise, a new product may need to use a new format for confirming license revocations.

Another aspect of the generic feature-licensing system that may need to be modified under certain circumstances involves the management of feature credits. For example, a new product may require a new credit-deduction policy in which feature credits are consumed in a new way for feature additions and upgrades. Likewise, a new credit-refund policy may be needed for a certain customer so that feature-credit refunds are made in a new way when a feature is removed or downgraded or when a license is revoked. As another example, the credit-overdraft policy may need to be modified for a new product which allows the credit balance for a particular customer's product feature to be negative.

Even if a new product does not require a newly created modification to the feature-licensing process, it may require new combinations of previously created modifications to the feature-licensing process. For example, a new product may require the use of an existing version of the generic feature-license format and an existing credit-refund policy for the feature-downgrade process. However, it may be the case that no other products use this same combination of the license format and the credit-refund policy.

In some cases the types of modifications discussed above to the feature-licensing process may be needed for an existing product, not just a new product. For example, the license-file version and format used by a product already supported by the feature-licensing system may need to be changed during its life cycle.

In order to implement modifications of the types discussed above, new software releases generally need to be developed and tested, which can impose significant costs to implement, particularly if such modifications need to be performed on a frequent basis. To reduce these costs and to simplify the manner in which modifications to the feature-license process is performed, a feature-licensing process configuration system is provided as an adjunct to the generic feature-licensing system. The combination of the generic feature-licensing system, which for simplicity is often referred to herein as a licensing system, and the feature-license process configuration system, which for simplicity is often referred to herein as a configuration system, is referred to as a feature-licensing process configuration framework or simply a configuration framework.

Figure 1:
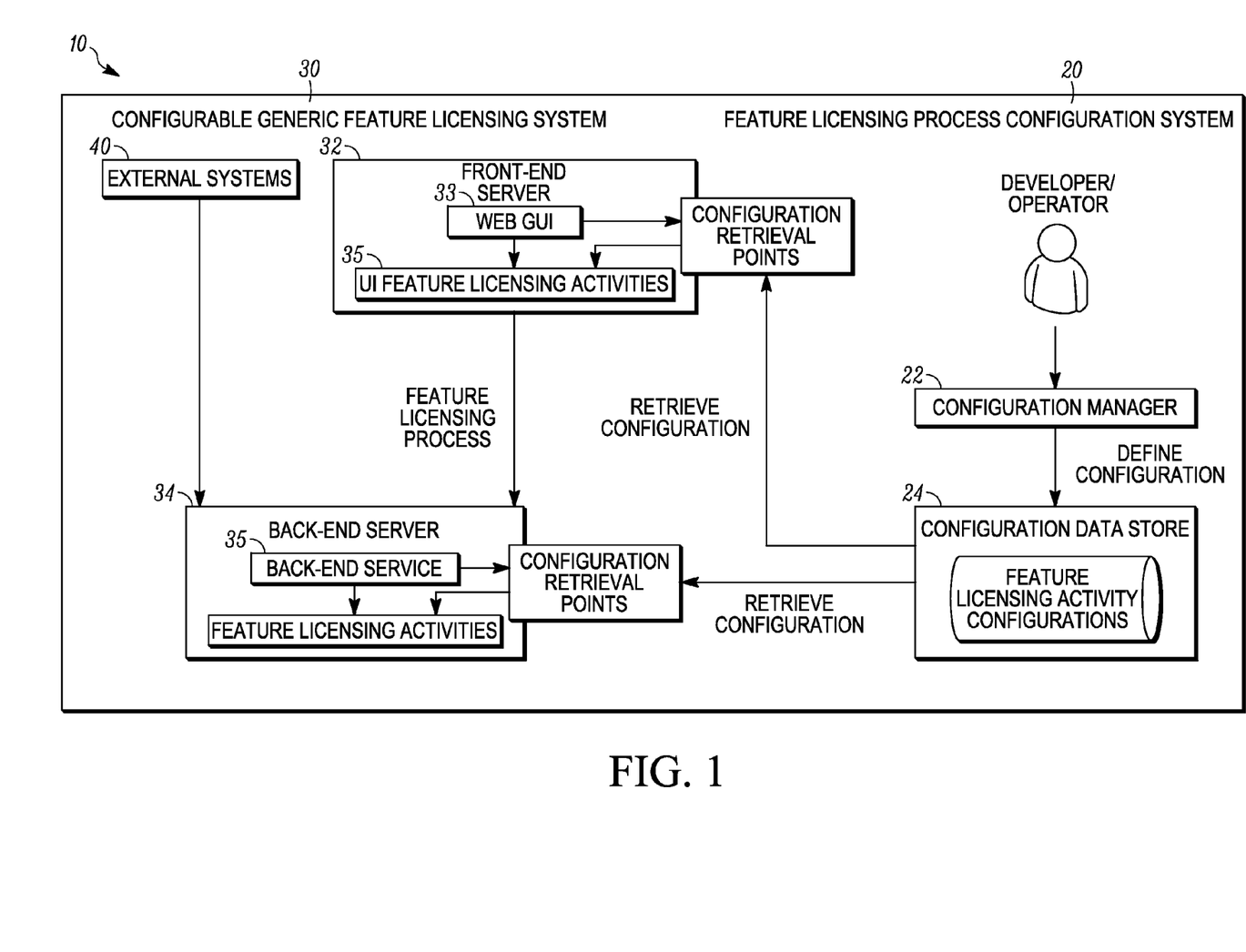
FIG. 1 shows a simplified block diagram of the architecture for one example of a feature-licensing process configuration framework.

FIG. 1 shows a simplified block diagram of the architecture for one example of a feature-licensing process configuration framework 10. The configuration framework 10 includes licensing system 30 and configuration system 20.

Any feature-licensing process performed by the licensing system 30 may be divided into a series of atomic operations, which are referred to herein as feature-licensing activities. A particular feature-licensing process can be formed from different combinations of pre-existing feature-licensing activities with the assistance of the configuration system 20. A particular combination of feature-licensing activities is defined as a feature-licensing activity configuration by a developer or operator using a configuration manager 22 in the configuration system 20.

The activity configurations defined in this manner may be stored in a data store 24 maintained by the configuration system 20. In this way, licensing activities can be reused in licensing processes other than those for which they were created. Moreover, the configuration system 20 allows the different licensing activities to be dynamically combined in different ways for use in different activity configurations. The configuration system 20 also allows the licensing system 30 to identify one or more activity configurations stored in the data store 24 which are most appropriate for a given licensing process.

The licensing system 30 shown in FIG. 1 includes a front-end server 32 and a back-end server 34. The front-end server 32 includes a web-based graphics user interface ("GUI") 33 and a UI 35 for implementing feature-licensing activities. A user may log into the web-based GUI 33 to perform various feature-licensing processes. The web-based GUI 33 s responsible for retrieving necessary system feature-licensing activity configurations from the configuration system 20 and for invoking the UI-related feature-licensing activities included in the configurations that are retrieved. The back-end server 34 includes a back-end service component 35 which is responsible for retrieving feature-licensing activity configurations employed by a licensing process and for invoking the feature-licensing activities included in those configurations. The back-end service component 35 also communicates with external systems 40.

The selection of a particular activity configuration from the configuration data store 24 is determined at a configuration retrieval point in the feature-licensing process. Feature-licensing activity configurations are identified and retrieved from the data store 24 in the configuration system 20 based on a set of configuration-lookup attributes, which are discussed in more detail below. Once a particular activity configuration is retrieved, the feature-licensing activities specified in that configuration are invoked and become actual steps in the feature-licensing process that is being performed. A given feature-licensing process may have multiple configuration retrieval points, at each of which one activity configuration is retrieved. Clearly, the exact behavior of any feature-licensing process is determined at least in part by the feature-licensing activity configurations retrieved from the configuration data store 24.

A feature-licensing system supports various feature-licensing processes. A licensing process performs one of many actions on a feature, such as license generation, license update and license revocation, as well as the feature credit-management tasks associated with the action. Each licensing process is divided into a number of steps, which lead towards the overall result of the process. Each step is the smallest functional unit able to perform an atomic operation with simple inputs and outputs. As noted above, such a step is referred to herein as a feature-licensing activity (or activity). A newly developed licensing process includes a series of new and pre-existing activities.

The following is an illustrative, non-exhaustive set of feature-licensing activities, each of which corresponds to an atomic step in a licensing process:

Check Feature Difference: This activity determines any differences between a feature in an existing license and in a new license request.

Upgrade Feature: This activity increases the quantity of an integer feature for a new license when the requested quantity of the feature is more than its quantity in the existing license.

Downgrade Feature: This activity reduces the quantity of an integer feature for a new license when the requested quantity of the feature is less than its quantity in the existing license.

Add Feature: This activity adds to a new license a requested feature that is not in the existing license.

Delete Feature: This activity removes a feature that is in the existing license but not in the request for a new license.

Generate License File: This activity generates a license file that contains a set of features and their attributes.

Process Revocation Confirmation File: This activity validates a license revocation confirmation file.

Set License Status: This activity sets the status of a license.

Deduct Credit: This activity deducts a certain amount of credits from a customer's credit pool for a feature.

Refund Credit: This activity adds a certain amount of credits to a customer's credit pool for a feature.

With the above feature-licensing activities defined, a new license-generation process could include, for instance, the "Add Feature," "Deduct Credit," and "Generate License File" activities. Similarly, a license-revocation process could include the "Delete Feature," "Set License Status," and "Refund Credit" activities. As yet another example, a license-upgrade process could include the "Check Feature Difference," "Upgrade Feature," "Add Feature," "Deduct Credit," and "Generate License File" activities. In general, a real feature-licensing process is more complicated and is composed of more feature-licensing activities than the processes illustrated above.

Figure 2:
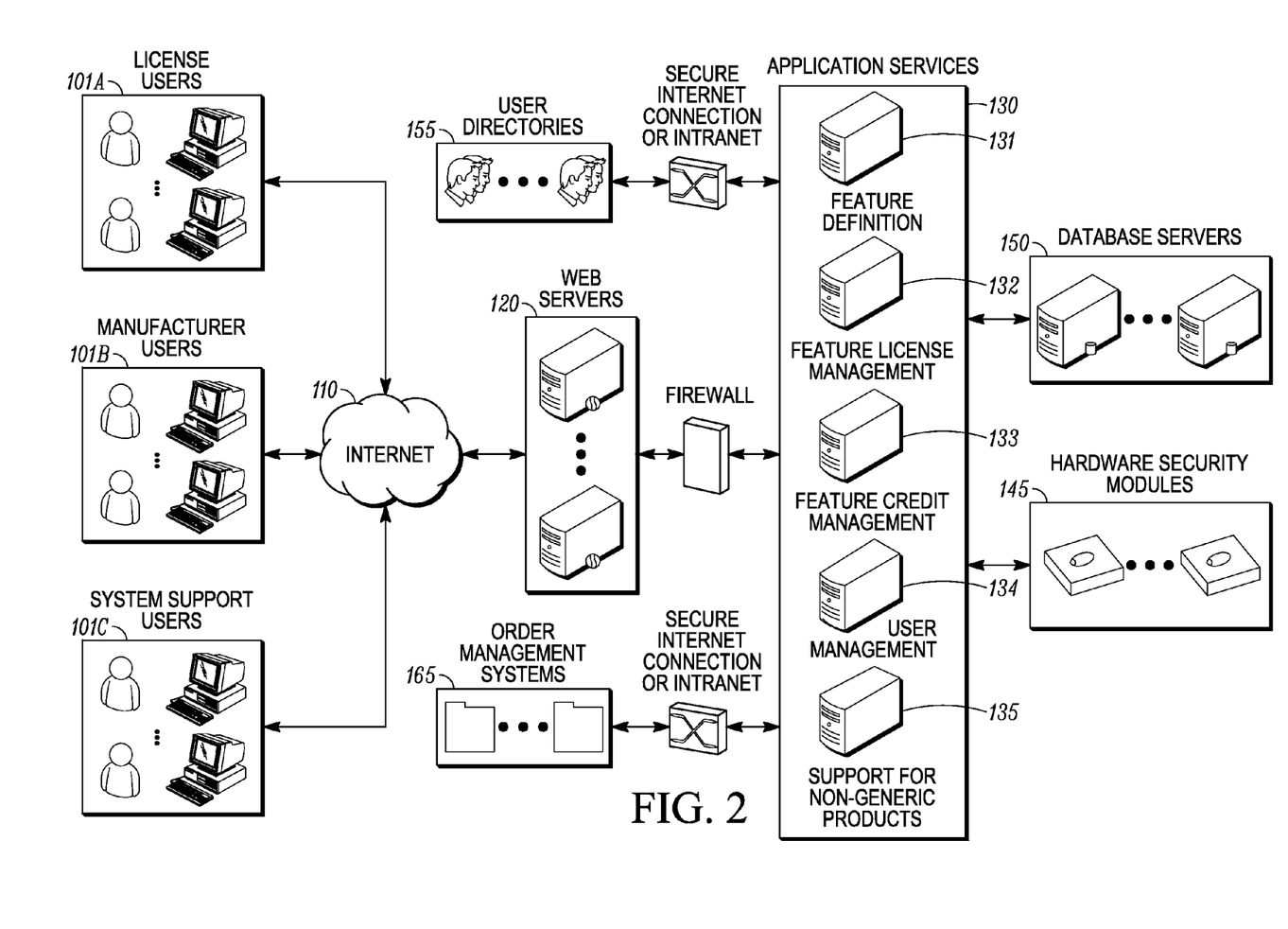
FIG. 2 shows the logical architecture of one implementation of a feature-licensing system.

FIG. 2 shows the logical architecture of one particular example of a feature-licensing system of the type shown in FIG. 1. This example is presented for illustration purposes only and not as a limitation on the subject matter disclosed herein. In this example three categories of users are represented by users 101A through 101C (collectively, 101). Users 101A are license users who are representative customers of the feature-licensing system such as service providers who obtain products from their respective manufacturers on behalf of end users. Alternatively, the customers may be the end users themselves. Users 101B are manufacturer users who are representative of the manufacturers of the products for which feature licenses are being provided. Users 101C are system-support users who are internal system-administrative users who belong to the hosting organization that operates and maintains the licensing system. Certain advanced administrative functions may be limited to internal-network access only and may not be exposed to a public network.

The users 101 communicate with the system over the Internet 110 or any other packet-based wide area network. In this example, the users 101 access and interact with the system through one or more web servers 120 which provide a single front-end interface that is accessed by a client-based application such as a conventional web browser.

The feature-licensing system typically includes one or more physical server computers with one or more physical storage devices and databases as well as various processing engines. In particular, in the example shown in FIG. 1, the feature-licensing system includes one or more service components 130 that typically reside on application servers which execute one or more applications that provide various feature-licensing services to the clients 101. In FIG. 1 five logical service components or modules are shown: a feature-definition component 131, a feature-license management component 132, a feature credit-management component 133, a user-management component 134, and a non-generic product-support module 135.

The feature-licensing system also includes hardware security modules 145 in which cryptographic keys used to protect licenses may be stored for use by the system. The feature-licensing system also contains a database 150 of records. These records may pertain to issued licenses, original requests for new licenses, audit data, control-policy information, organization information, project configurations, account relationships, product configurations, user information, and other record types as necessary. The service components have access to user directories 155, which may be the internal enterprise user directories that belong to the various users. The service components also have access to order management systems 165, where sales orders for product features are maintained.

At a high level, the modules that make up the service components 130 provide the following functions and services. Some or all of these functions and services may correspond to one or more licensing processes as described above, which may each be divided into a series of feature-licensing activities. The feature-definition module 131 stores the product-feature information associated with the various product lines of the manufacturers who are supported by the feature-licensing system. This module is structured so that it is generic enough to support commonalities among various feature-licensing needs. At the same time it is extensible enough to be able to accommodate any peculiarities in the feature specification of certain product lines.

The feature-license management module 132 supports routine feature-license management tasks such as license generation, updates, enforcement, and revocation. This module should be able to carry out such tasks in a generic manner so that it can be shared among different product lines. In addition, because the scale of deployment and the update schedule can vary widely across different product lines, in some implementations the management tasks should support a batch mode of operation.

The feature credit-management module 133 obtains feature-credit information from customer-sales order systems, which manage feature-sales orders for the respective customers. This module keeps track of any change in feature credits so that they are accurately accounted for during credit creation and adjustment, as well as license generation, update, and revocation.

The user-management module 134 integrates with existing user directories of the various users so that the system can be accessed using a single sign-on interface to avoid duplicating user information. This module also manages user privileges so that they are properly authorized to perform certain tasks while being prohibited from performing other tasks.

The non-generic product support module 135 allows legacy products that may be too difficult to migrate to the generic framework to nevertheless be integrated into the feature-licensing system. Likewise, certain new products, which for various reasons may not be able to use the generic license format, can also be supported by the feature-licensing system.

The licensing system is flexible in its support for products with different levels of computing capabilities, device ID modifiability and storage security, as well as for different needs of license portability.

Another module associated with the system is a device-license module, which is located on the product devices. The device-license module is responsible for all feature-license related operations, such as license validation, feature-attribute value reporting, license-revocation confirmation generation, etc. It is integrated into product software, which communicates with the module through a programming interface.

As discussed above, a particular set of feature-licensing activities which make up a feature-licensing process is referred to as a feature-licensing activity configuration. The data store 24 in the feature-license process configuration system 120 may store the following configuration data:

feature-licensing activity identification and parameter information, feature-licensing activity configurations, and configuration-lookup attribute. Each of these configuration data types is described in turn. Additionally, the relationship among them is subsequently described in connection with the example shown in FIG. 3.

Each feature-licensing activity has a set of identification attributes and a list of parameters associated therewith. An activity's identification attributes include an identification number ("ID"), a name, and a type. The ID of an activity is used to reference the activity in the feature-licensing system. The name of an activity describes the activity and may be displayed to the user by the configuration manager. The type of an activity is used to group related activities.

Activity parameters associated with a feature-licensing activity are the inputs and outputs employed by the activity. Each activity has zero or more parameters. In the feature-licensing process configuration system, each activity parameter has a unique ID, a name, and a type. The ID of a parameter is used by activities to reference the parameter. The name of a parameter describes the parameter and may be displayed by the configuration manager. The type of a parameter specifies the type of value it can hold, such as an integer, string, boolean, object, etc. Activity parameters may be uniquely defined across the configuration system so that different activities can share common activity parameters. For example, the same "FeatureID" parameter can be used by both of the "Add Feature" and "Delete Feature" activities, among others that also make use of this same parameter.

Each feature-licensing activity configuration has an ID, a name, and a type associated therewith. The configuration type is determined by the activities it contains and indicates the licensing process or processes for which it should be used. For example, an activity configuration that contains the "Add Feature" and "Deduct Credit" activities may have the type "LicenseGeneration," which indicates that the configuration is to be used in the license-generation process.

Each type of activity configuration may have a default configuration. A default configuration for a particular type of activity configuration may be used in a licensing process that needs this particular type of configuration and no other configuration of the same type is available. How a default configuration is defined and used is explained below.

For feature-licensing activity configurations to be useful in a particular circumstance, they should be retrievable by the feature-licensing system based on certain attributes that describe the circumstances in which the activity configuration may be used. Accordingly, each activity configuration should have at least one set of lookup attributes for it to be retrievable by the feature-licensing system.

A configuration-lookup attribute set has a configuration type as one attribute and zero or more additional attributes. In general, the configuration type in the attribute set will be the same as the configuration type of the configuration that it describes. Additional attributes in a lookup attribute set can be anything used by the licensing system and can vary from one attribution set to another for the same configuration. For example, one set of lookup attributes of the configuration type "LicenseGeneration" may include the configuration type, product ID, and customer ID, while another set of lookup attributes for the same configuration may include the configuration type and the customer site ID. However, in this example the configuration type in both sets of lookup attributes is "LicenseGeneration."

Among all the lookup-attribute sets belonging to different activity configurations, no two can be identical to another. For example, for two different configurations, if a lookup-attribute set for the first configuration includes a configuration type of "LicenseGeneration," a product ID of 2, and a customer ID of 5, then a lookup attribute set for the second configuration cannot include a configuration type of "LicenseGeneration," a product ID of 2, and a customer ID of 5. This restriction ensures that at most one activity configuration will be found with the same set of lookup attributes. The particular attributes to be included in a set of configuration-lookup attributes may depend on a variety of factors such as product-licensing requirements, which are reflected in the makeup of the licensing-scenario attribute set of a configuration retrieval point in a licensing process. The licensing-scenario attribute set and its relationship to the configuration-lookup attribute set is explained below when the feature-licensing activity configuration retrieval process is discussed.

Figure 3:
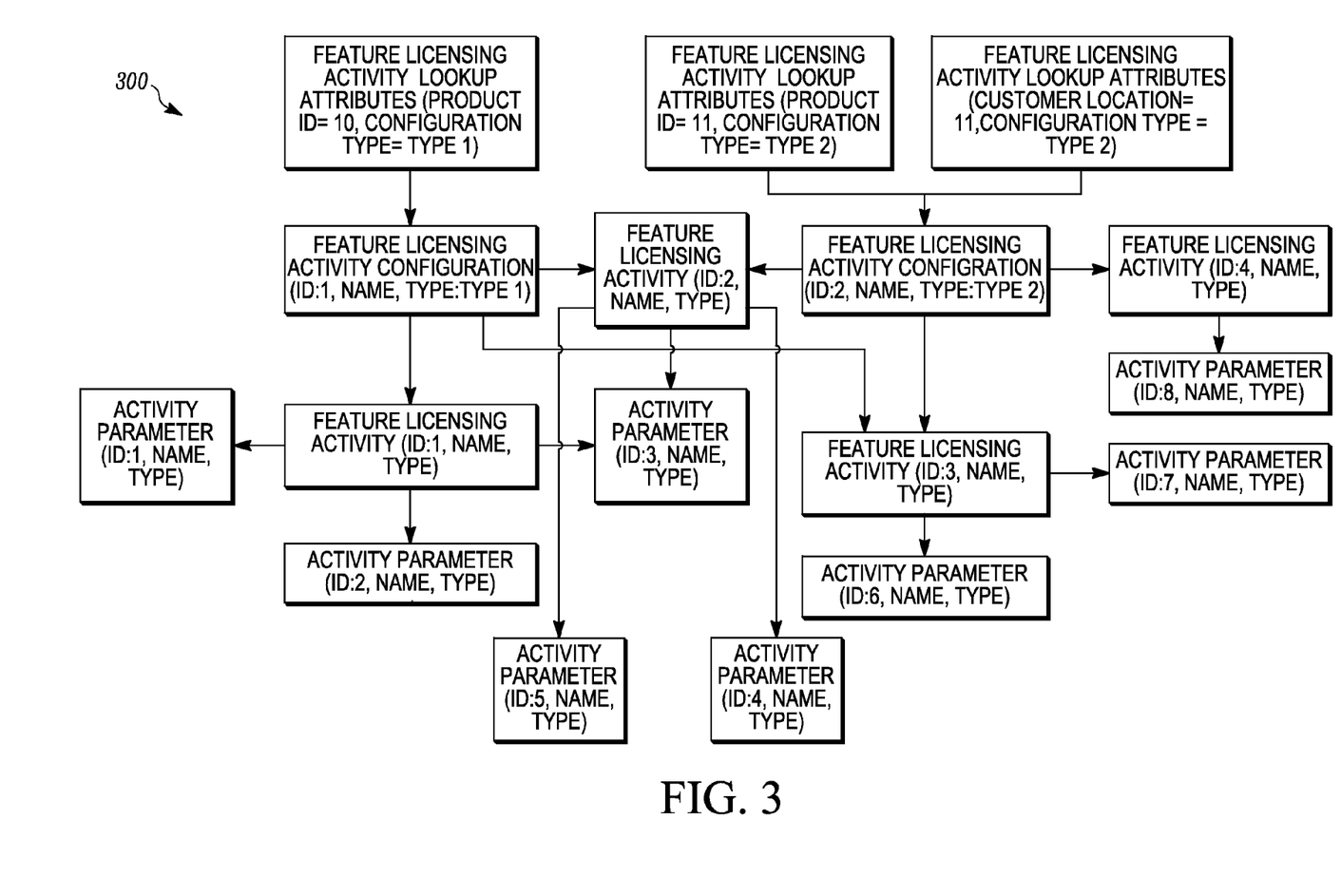
FIG. 3 shows the logical relationship among the configuration data types.

In order to facilitate an understanding of the aforementioned activity configuration data items and their relationship to one another, the illustrative configuration data set 300 shown in FIG. 3 is discussed. This example shows one activity configuration with an ID of one ("configuration 1") and a second activity configuration with an ID of two ("configuration 2"). Configuration 1 has one set of lookup attributes while configuration 2 has two sets of lookup attributes. The attributes included in each lookup-attribute set allow the feature-licensing system to identify and retrieve an activity configuration that is appropriate for a given set of circumstances when executing a licensing process.

Each configuration includes one or more licensing activities. For instance, in the example of FIG. 3, configuration 1 includes three licensing activities, licensing activity 1, licensing activity 2, and licensing activity 3. Configuration 2 also includes three licensing activities, which in this case are licensing activity 2, licensing activity 3, and licensing activity 4. Accordingly, activities 2 and 3 are included in both configuration 1 and in configuration 2.

Moreover, each activity has one or more parameters. For instance, in the example of FIG. 3 activity 1 has activity parameters 1, 2, and 3, activity 2 has activity parameters 3, 4, and 5, activity 3 has activity parameters 6 and 7, and activity 4 has activity parameter 8. It should be noted that activity parameters are sharable among different activities. In FIG. 2 for example, the activity parameter 3 is shared by activities 1 and 2.

It also should be noted that in some implementations the configuration data maintained by the licensing-process configuration system is stored in its own data store (e.g., data store 24 in FIG. 1), which is logically separate from the data store of the licensing system. The separation is not necessarily a physical separation. Rather, the separation is in terms of a referential relationship to one another. Although the configuration data stored in the configuration system reference licensing data in the licensing system, these references may be based on identities that are defined outside of the particular data-storage mechanism being used. Such identities are referred to as database-independent identities.

Specifically, when data are stored in one or several relational database management systems ("RDBMS"), the references to the licensing data are not based on identities generated by the database systems. For example, if a new product added to the licensing system has a database-generated identity of 10 while having a database-independent identity of 4309, then when the configuration data in the configuration system need to reference this new product, it uses identity 4309 rather than database-generated identity 10.

This kind of referential separation makes it possible for data changes in one instance of the system to be transferred to another instance and remain valid. Because database-generated identities in different instances of the system are typically not guaranteed to be the same for the same entity, a reference to an entity based on its database-generated identity in one system instance may be invalid in another system instance. On the other hand, if database-independent identities are used, references to entities in one system instance will be valid in any other system instance. This property of data reference is called cross-system referential validity.

A downside of using database-independent identities for references to licensing data so that cross-system referential validity can be achieved is that referential integrity is enforced by the RDBMS. However, the references to licensing data in the licensing system, such as products, features, and customers, etc., only appear in configuration-lookup attributes. As a consequence, a broken reference in a configuration-lookup attribute set would only result in that attribute set not being used. Thus, the effect of a broken reference to licensing data in the configuration data is limited. Therefore, in many cases the price paid by not having referential integrity between the configuration data and the licensing data may be worth the benefit obtained by having cross-system referential validity, which allows easy transferability of the configuration data from one system instance to another.

In the configurable feature-licensing system, each licensing process has one or more configuration retrieval points. At each configuration retrieval point, certain information describing the specific circumstances or scenario in which the licensing process is initiated, including the desired type of activity configuration, is passed by the licensing system to the configuration system. Such information is referred to as licensing-scenario attributes. Licensing-scenario attributes are used by the configuration system to select an appropriate activity configuration which is available in the configuration system. The appropriate activity configuration is one that may be used in the licensing process at the configuration retrieval point for which it has been selected. The configuration system then returns the activity configuration, including the identification and parameter information of the activities in the configuration, to the feature-licensing system.

Figure 4:
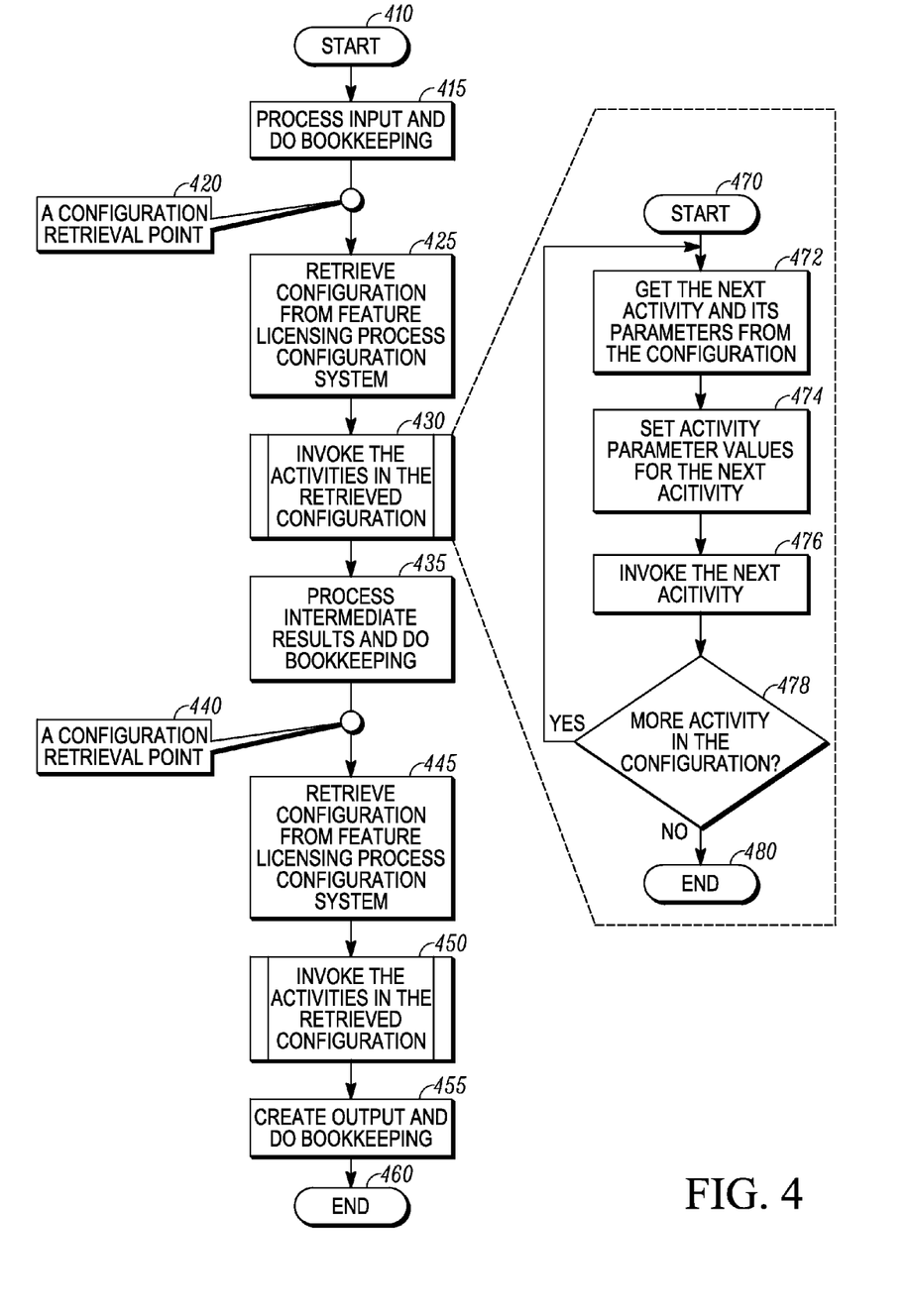
FIG. 4 shows a simplified example of a licensing process that includes two configuration retrieval points.

FIG. 4 shows a simplified example of a licensing process that includes two configuration retrieval points. In this example the process begins at block 410 and continues to block 415. Block 415 is representative of any activity or sequence of activities that the process performs before reaching the first configuration retrieval point 420. In this example various inputs are processed, and various bookkeeping matters performed at block 415. Upon reaching the first configuration retrieval point 420 the feature-licensing system retrieves at block 425 an activity configuration from the configuration system by first sending the configuration system licensing-scenario attributes associated with that configuration retrieval point 420. Next, at block 430, the licensing system sequentially invokes each of the activities included in the activity configuration that is retrieved.

Details of block 430 showing an example of the sub-process performed when the activity configuration is executed is shown in FIG. 4. The sub-process begins at block 470 and continues to block 472 where the licensing system obtains the first activity and its parameters from the activity configuration. At block 474 the licensing system sets the activity parameter values for the first activity. After invoking the first activity, the licensing system invokes the next activity at block 476. At decision block 478 the licensing system determines if there are more activities in the activity configuration. If not, then the sub-process ends at block 480. If there are one or more additional activities to be executed, then the sub-process returns to block 470, and the sub-process repeats for the next activity.

After the execution of the activity configuration at block 430 is complete, the process continues at block 435, which is representative of any activity or sequence of activities that the process performs after invoking the activity configuration. In this example various intermediate results are processed, and various bookkeeping matters performed at block 435. Next, a second configuration retrieval point is reached at block 440, and the feature-licensing system retrieves at block 445 another activity configuration from the configuration system by first sending the configuration system licensing-scenario attributes associated with that configuration retrieval point 440. It should be noted that in general a licensing process may include any number of activity configuration points. At block 450 the licensing system sequentially invokes each of the activities included in the activity configuration that is retrieved. After the execution of the activity configuration at block 450 is complete, the process continues at block 455, which is representative of any activity or sequence of activities that the process performs after invoking the activity configuration. In this example the output of the licensing process is created, various intermediate results are processed, and various bookkeeping matters performed at block 455. Finally, the process terminates at block 460.

Figure 5:
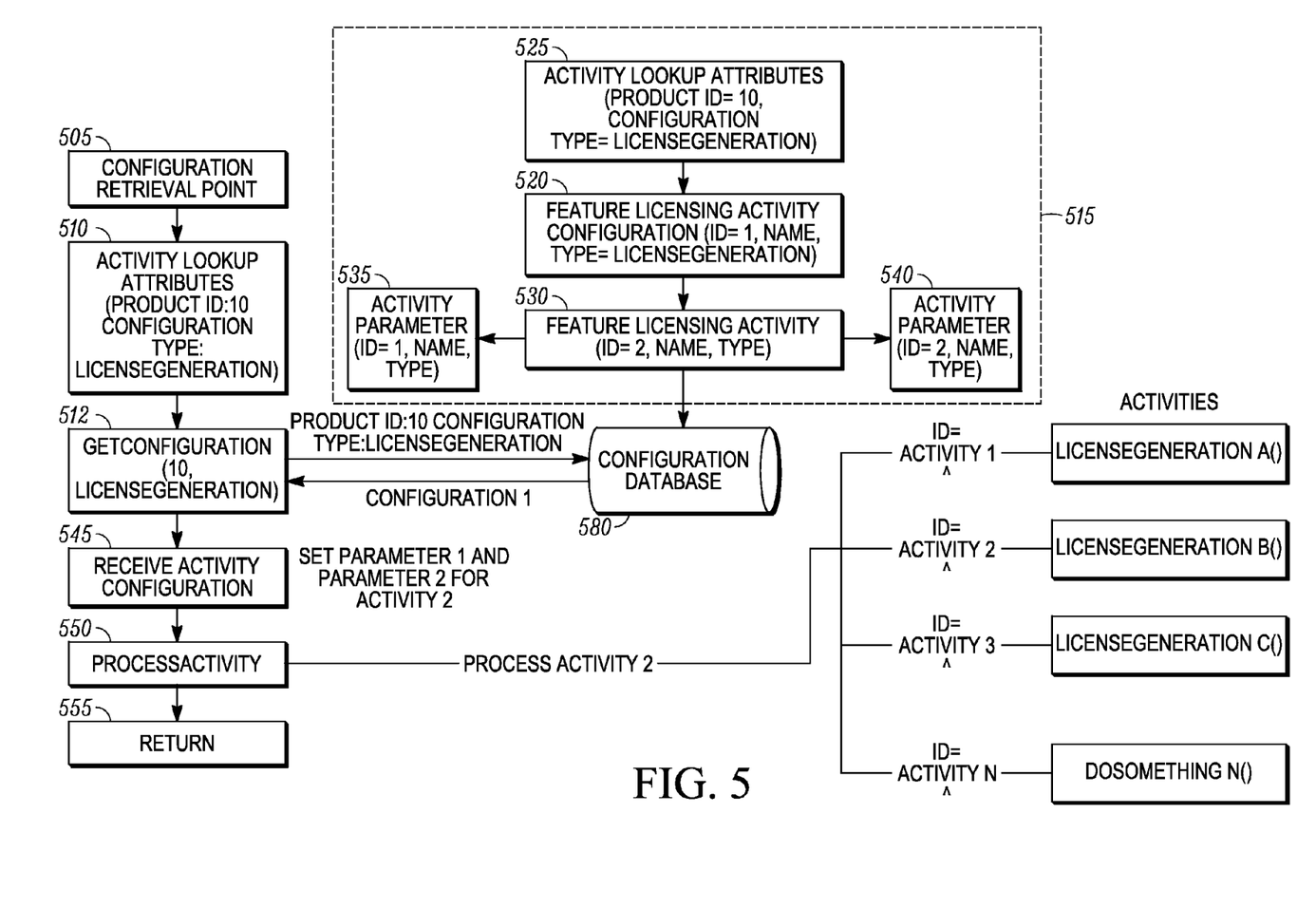
FIG. 5 shows in greater detail the manner in which the licensing system retrieves an activity configuration during the licensing process shown in FIG. 4.

FIG. 5 shows in greater detail the manner in which the licensing system retrieves an activity configuration when a license-generation process is initiated for a product with an ID of ten reaches a configuration retrieval point at block 505. In response, the licensing system retrieves at block 510 the appropriate licensing-scenario attributes associated with the configuration retrieval point. At block 512 the licensing-scenario attributes are sent to the configuration system database 580 (via the configuration manager) in order to locate a suitable activity configuration. In this example, the licensing-scenario attributes are a product ID=10 and a configuration type "LicenseGeneration." The configuration system searches the configuration data in the configuration system database 580 to find a match between these licensing-scenario attributes and the activity-lookup attributes.

In the example of FIG. 5 the configuration system locates configuration data 515, which include lookup attributes 525 that match the licensing-scenario attributes provided to the configuration system. The lookup attributes 525 are arranged with an activity configuration 520 having an ID=1. As shown, the activity configuration 520 has a single licensing activity 530 having an ID=2. The licensing activity 530, in turn, has two activity parameters 535 and 540, one with an ID=1 and another with an ID=2. The configuration system passes the activity configuration 520 to the licensing system along with the information about activity 530 and its activity parameters 535 and 540. The licensing system receives this information at block 545. The licensing system then processes the activity configuration 520 at block 550. In particular, the licensing system examines the activity configuration 520 and recognizes that it includes licensing activity 530 with an ID=2, which it retrieves from a set of licensing activities 555. In this example the licensing system invokes the function which corresponds to licensing activity 530 with an ID=2, which is shown to be LicenseGenerationB( ). Since licensing activity 530 is the only activity in activity configuration 520, after the licensing system executes licensing activity 530 at block 550, the execution of the activity configuration is complete, and the licensing system returns to complete the remainder of the licensing process at block 555.

As discussed above, when identifying and retrieving a suitable activity configuration, licensing-scenario attributes provided by the licensing system are matched with configuration-lookup attributes. Accordingly, these two kinds of attributes are closely related. In fact, they are defined based on the same product-licensing requirements and the particular configuration retrieval points where they are used.

Licensing requirements for a particular product may require variations to the licensing process at various points. Such points naturally become configuration retrieval points, where a certain activity configuration is needed. For each configuration retrieval point, a set of scenario attributes is defined which specifies the conditions under which a variation to the licensing process is required. At the same time, a set of lookup attributes is defined for an activity configuration that is to be retrieved at that particular configuration retrieval point. For example, at the point in the license-generation process where feature credits are handled, several products may need an extra step to handle third-party feature credits. The scenario attribute set for this configuration retrieval point would include a product ID in addition to a mandatory configuration type. Correspondingly, the activity configuration that contains the third-party feature credit handling activity would have a set of lookup attributes that includes the product ID and configuration type.

In some implementations there are two categories of configuration retrieval points: "configuration-required" and "configuration-optional." At a configuration-required retrieval point, one and only one activity configuration is to be retrieved from the licensing-process configuration system. At a configuration-optional retrieval point, one or zero activity configurations are to be retrieved.

For each configuration-required retrieval point, exactly one default activity configuration is defined with a single lookup attribute, which is the configuration type. If no activity configuration is found at a configuration-required retrieval point which has a lookup attribute set that matches the scenario attribute set of the configuration retrieval point, then the default activity configuration for the specified configuration type will be returned to the licensing system. This use of a default activity configuration ensures that at least one activity configuration will be available at a configuration-required retrieval point.

On the other hand, a configuration-optional retrieval point does not require a default activity configuration. If no activity configuration is found at a configuration-optional retrieval point which has a lookup attribute set that matches the scenario attribute set associated with the configuration-optional retrieval point, no activity configuration is returned to the licensing system. In this case, the licensing process simply continues past the configuration-optional retrieval point without invoking any feature-licensing activity.

Based on the feature-licensing activity configurations retrieved for a specific product at configuration retrieval points, the feature-licensing process is able to behave very differently from product to product and from one version of a product to another. Because of this ability, the provision of the feature-license process configuration system as described above can significantly reduce the cost for developing a licensing process for new products and updating licensing processes for existing products.

The feature-licensing activities are shareable among different feature-licensing processes, even for different products. If all feature-licensing processes for a new product can be configured from existing feature-licensing activities, no new software release is needed. Only new configurations need to be created for a new product, which could be accomplished through the configuration manager. Likewise, when a feature-licensing process for an existing product needs to be changed, and the changes do not require completely new feature-licensing activities, the change can be accomplished by creating new licensing activity configurations that contain existing feature-licensing activities. Once again, no new software release is needed, and only new configurations need to be created.

When new feature-licensing activities are needed for either new or existing products, the new activities may be implemented and tested separately from existing activities. After new activities are added to the licensing system, new activity configurations can be created for the new or existing products which need a licensing process tailored to their needs. The changes to the licensing process caused by the new activity configurations would only be invoked for products that need such changes and will not affect the other products. Because the impact of new activities and new configurations is limited to the new and existing products that need changes to their licensing processes, the need for regression testing the other products that do not need such licensing process changes is greatly reduced. In addition, if the new activities are added to the licensing system through a plug-in mechanism that allows the licensing system to discover and invoke the new activities dynamically, then the licensing system does not even have to be restarted when new activities are added.

The use of database-independent identities by the configuration data for referencing the entities in the licensing system allows the configuration data to be applied in different instances of the system and remain valid. When certain configuration changes are to be validated in a test instance of the system before being applied to the product instance of the system, the changes can be applied to the test instance, tested, and then exported as a package using the configuration manager. The exported configuration package can then be imported into the production instance of the system using the configuration manager.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A system to enable customers to provision devices with feature licenses that enable specified features in the devices, the system comprising:

a feature-licensing system server for performing feature-licensing processes to provision the devices with the feature licenses, the feature-licensing processes including a series of feature-licensing activities that each perform an action on a feature license and at least one configuration retrieval point that arises between a specified pair of sequentially performed ones of the feature-licensing activities; and a feature-licensing process configuration system including:
  a data storage device for storing at least one feature-licensing activity configuration, the feature-licensing activity configuration including one or more feature-licensing activities; and
  a configuration manager server for selecting, responsive to a request from the feature-licensing system server, a first of the feature-licensing activity configurations when the licensing system reaches the configuration retrieval point while performing one of the feature-licensing processes and for providing the first feature-licensing activity configuration to the feature-licensing system server so that the feature-licensing activities included in the first feature-licensing activity configuration are invoked when the licensing process reaches the at least one configuration retrieval point,
  wherein at least one of the licensing activities included in the first feature-licensing activity configuration has one or more licensing-activity parameters associated therewith, the activity parameter including at least one input value to be used by the licensing activity with which it is associated when performing the action on the feature license.

2. The system of claim 1 wherein the data storage device is configured to further store at least one activity-lookup attribute associated with each of the activity configurations, the activity-lookup attribute describing circumstances in which the activity configuration with which it is associated may be used in a licensing process, the configuration manager server being further configured to identify and select one of the activity configurations based on the at least one activity-lookup attribute with which it is associated.

3. The system of claim 2 wherein a first of the activity-lookup attributes specifies a configuration type that defines a result to be achieved by the activity configuration with which the first activity-lookup attribute is associated.

4. The system of claim 3 wherein a second activity-lookup attribute specifies a product or product line to which the activity configuration associated with the second activity-lookup attribute is applicable.

5. A system to enable customers to provision devices with feature licenses that enable specified features in the devices, the system comprising:
  a feature-licensing system server for performing feature-licensing processes to provision the devices with the feature licenses, the feature-licensing processes including a series of feature- licensing activities that each perform an action on a feature license and at least one configuration retrieval point that arises between a specified pair of sequentially performed ones of the feature- licensing activities; and
  a feature-licensing process configuration system including:
    a data storage device for storing at least one feature-licensing activity configuration, the feature-licensing activity configuration including one or more feature-licensing activities; and
    a configuration manager server for selecting, responsive to a request from the feature-licensing system server, a first of the feature-licensing activity configurations when the licensing system reaches the configuration retrieval point while performing one of the feature-licensing processes and for providing the first feature-licensing activity configuration to the feature-licensing system server so that the feature-licensing activities included in the first feature-licensing activity configuration are invoked when the licensing process reaches the at least one configuration retrieval point,
    wherein the data storage device is configured to further store at least one activity-lookup attribute associated with each of the activity configurations, the activity-lookup attribute describing circumstances in which the activity configuration with which it is associated may be used in a licensing process, the configuration manager server being further configured to identify and select one of the activity configurations based on the at least one activity-lookup attribute with which it is associated, and
  wherein each of the activity configurations has one or more activity-lookup attributes that are each uniquely defined across all of the activity configurations. The system of claim 2 wherein each of the activity configurations has one or more activity-lookup attributes that are each uniquely defined across all of the activity configurations.

6. The system of claim 1 wherein one of the licensing-activity parameters is associated with two or more licensing activities.

7. A system to enable customers to provision devices with feature licenses that enable specified features in the devices, the system comprising:
  a feature-licensing system server for performing feature-licensing processes to provision the devices with the feature licenses, the feature-licensing processes including a series of feature-licensing activities that each perform an action on a feature license and at least one configuration retrieval point that arises between a specified pair of sequentially performed ones of the feature- licensing activities; and
  a feature-licensing process configuration system including:
    a data storage device for storing at least one feature-licensing activity configuration, the feature-licensing activity configuration including one or more feature-licensing activities; and
  a configuration manager server for selecting, responsive to a request from the feature-licensing system server, a first of the feature-licensing activity configurations when the licensing system reaches the configuration retrieval point while performing one of the feature-licensing processes and for providing the first feature-licensing activity configuration to the feature-licensing system server so that the feature-licensing activities included in the first feature-licensing activity configuration are invoked when the licensing process reaches the at least one configuration retrieval point,
    wherein the feature-licensing system server is configured to provide one or more licensing-scenario attributes to the configuration manager server, each of the one or more licensing-scenario attributes being associated with at least one of the configuration retrieval points, the configuration manager server being further configured to select the first feature-licensing licensing activity configuration based on the one or more licensing scenarios.

8. The systems of claim 7 wherein the configuration manager server is further configured to select the first feature-licensing activity configuration by comparing the one or more licensing-scenario attributes to the activity-lookup attributes stored in the data storage device.

9. The system of claim 1 wherein the feature-licensing activities in the activity configurations stored in the data storage device are feature-licensing activities previously employed in a feature-licensing process different from the feature-licensing process in which the configuration retrieval point arises.

10. The system of claim 1 wherein feature-license configuration data stored in the data storage device are referenced by a database-independent identity.

11. A method for modifying a feature-licensing process that provisions devices with feature licenses that enable specified features in the devices, the method comprising:
   executing a feature-licensing process by a feature licensing system server that includes a series of feature-licensing activities that each perform an action on a feature license;
   upon reaching a configuration retrieval point that arises between a specified pair of sequentially performed ones of the feature-licensing activities, selecting, by the feature licensing system server, from a data storage device a first of a plurality of feature-licensing activity configurations, the first feature-licensing activity configuration including one or more feature-licensing activities previously employed in a feature-licensing process different from the feature-licensing process in which the configuration retrieval point arises;
   executing, by the feature licensing system server, the feature-licensing activities included in the first feature-licensing activity configuration; and
   after executing each of the feature-licensing activities included in the first feature-licensing activity configuration, executing, by the feature licensing system server, remaining ones of the feature-licensing activities in the series of feature-licensing activities,
   wherein at least one of the licensing activities included in the first feature-licensing activity configuration has one or more licensing activity parameters associated therewith, the activity parameter including at least one input value to be used by the licensing activity with which it is associated when performing the action on the feature license.

12. The method of claim 11 wherein selecting the first feature-licensing activity configuration includes identifying and selecting the first feature-licensing activity configuration, by the feature licensing system server, based on at least one activity-lookup attribute with which it is associated, the activity-lookup attribute describing circumstances in which the first feature activity configuration may be used in a licensing process.

13. The method of claim 12 wherein a first of the activity-lookup attributes specifies a configuration type that defines a result to be achieved by the feature-licensing activity configuration with which the first activity-lookup attribute is associated.

14. The method of claim 13 wherein a second of the activity-lookup attributes specifies a product or product line to which the feature-licensing activity configuration associated with the second activity-lookup attribute is applicable.

15. A method for modifying a feature-licensing process that provisions devices with feature licenses that enable specified features in the devices, the method comprising:
   executing a feature-licensing process by a feature licensing system server that includes a series of feature-licensing activities that each perform an action on a feature license;
   upon reaching a configuration retrieval point that arises between a specified pair of sequentially performed ones of the feature-licensing activities, selecting, by the feature licensing system server, from a data storage device a first of a plurality of feature-licensing activity configurations, the first feature-licensing activity configuration including one or more feature-licensing activities previously employed in a feature-licensing process different from the feature-licensing process in which the configuration retrieval point arises;
   executing, by the feature licensing system server, the feature-licensing activities included in the first feature-licensing activity configuration; and
   after executing each of the feature-licensing activities included in the first feature-licensing activity configuration, executing, by the feature licensing system server, remaining ones of the feature- licensing activities in the series of feature-licensing activities,
   wherein selecting the first feature-licensing activity configuration includes identifying and selecting the first feature-licensing activity configuration, by the feature licensing system server, based on at least one activity-lookup attribute with which it is associated, the activity-lookup attribute describing circumstances in which the first feature activity configuration may be used in a licensing process,
   wherein each of the feature-licensing activity configurations has one or more activity-lookup attributes associated therewith that are each uniquely defined across all of the feature-licensing activity configurations.

16. The method of claim 11 wherein one of the licensing activity parameters is associated with two or more licensing activities.

17. The method of claim 15 further comprising comparing one or more licensing-scenario attributes to the activity-lookup attributes stored in the data storage device to select the first feature-licensing activity configuration based on the one or more licensing scenarios, the licensing-scenario attributes being associated with the configuration retrieval.

* * * * *